C. C. SCHMAND.
DRIVING MECHANISM.
APPLICATION FILED SEPT. 6, 1921.
1,417,862.
Patented May 30, 1922.
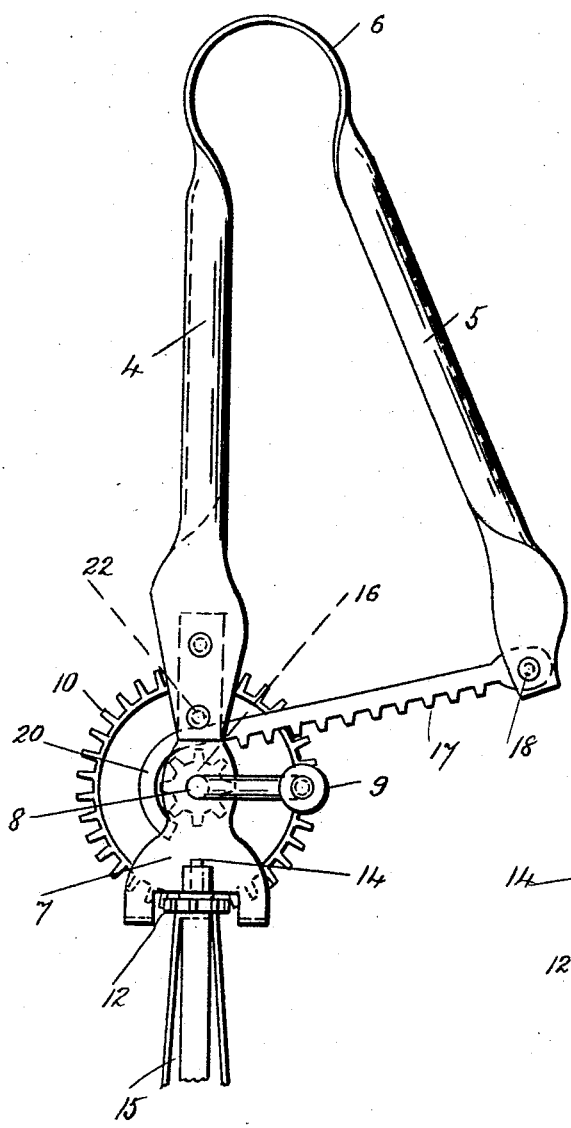
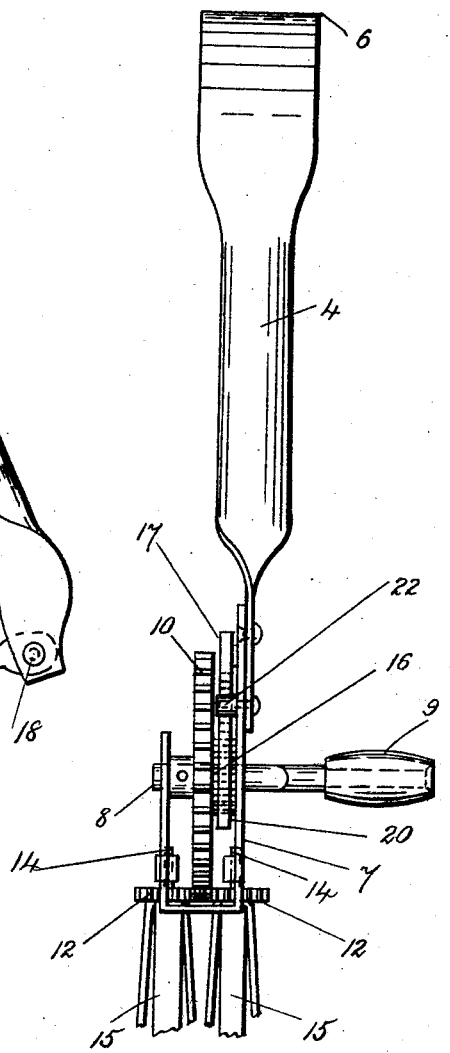
Inventor
Charles C. Schmand.
by Herbert W. Jenner,
Attorney.

UNITED STATES PATENT OFFICE.

CHARLES C. SCHMAND, OF GRAYS RIVER, WASHINGTON.

DRIVING MECHANISM.

1,417,862. Specification of Letters Patent. Patented May 30, 1922.

Application filed September 6, 1921. Serial No. 498,611.

*To all whom it may concern:*

Be it known that I, CHARLES C. SCHMAND, a citizen of the United States, residing at Grays River, in the county of Wahkiakum and State of Washington, have invented certain new and useful Improvements in Driving Mechanism, of which the following is a specification.

This invention relates to driving mechanism operated by hand and specially adapted to drive beaters for eggs and other similar viscous substances or fluids; and it consists in the novel construction and combination of the parts hereinafter fully described and claimed whereby the mechanism can be operated by one hand only, or by both hands simultaneously without any change or adjustment of its parts.

In the drawings, Figure 1 is a side view of a driving mechanism constructed according to this invention. Fig. 2 is a side view of the mechanism turned around one-quarter from the position shown in Fig. 1.

A spring handle having finger bars 4 and 5 is provided, and 6 is the curved spring which unites the upper ends of the finger bars. The stationary finger bar 4 has a frame 7 secured to its lower end portion, and 8 is a crankshaft journaled in the frame 7 and provided with a crank handle 9 for revolving it or for oscillating it.

A toothed driving wheel 10 is secured on the crankshaft, and in a beater of approved construction this wheel 10 is a crown wheel which gears into two toothed pinions 12 arranged one on each side of it. The pinions 12 are journaled on parallel shafts 14 secured to the frame 7, and 15 are portions of the beater members which are secured to the pinions 12. These beater members are oscillated or revolved by the pinions and crown wheel according to the oscillating or revolving motion imparted to the crankshaft by one hand when the finger bars are grasped firmly but lightly by the other hand.

When used in this manner the device is adapted to beat thin fluids which do not require much power, and the driving wheel can advantageously be revolved continuously.

A toothed pinion 16 is secured on the crankshaft parallel to the driving wheel 10, and 17 is a toothed rack one end portion of which is pivoted to the lower end portion of the movable finger bar 5 by a pin 18. The free end portion of the rack is provided with a smooth curved hook 20 which engages with the tops of the teeth of the pinion when the parts are in the positions shown in Fig. 1, and the toothed rack 17 is out of engagement with the pinion 16. A pin 22 is secured to the frame above the toothed rack, and when the finger bars are grasped tightly so that the finger bar 5 is moved toward the finger bar 4, the rack gears into the pinion, and the pin 22 holds it in working engagement.

The rack is reciprocated by one hand which alternately grasps and releases the spring handle, and the crankshaft is simultaneously oscillated by the other hand, when a stiff fluid is to be beaten, and considerable power is required. If desired, the rack and pinion can be operated instead of the crank handle, when only a little power is required to beat a thin fluid.

The change in the driving power is made without making any change in the mechanism, or making any alteration or adjustment of any of its parts.

What I claim is:

1. A driving mechanism, comprising a handle formed of two finger bars having their upper ends connected by a spring, a frame secured to one finger bar, a crankshaft journaled in the said frame and provided with a crank-handle, a driving wheel and a toothed pinion secured side by side on the crankshaft, and a toothed rack pivoted to the other finger bar and adapted to engage with the said pinion, the said rack having a smooth hooked portion at its free end which bears on the toothed pinion when the rack is out of gear with it, the said driving wheel being operated by the movement of either hand singly or by both hands simultaneously at will.

2. A driving mechanism, comprising a frame, a crankshaft journaled therein, a crank secured to the crankshaft and adapted to be revolved by one hand, a forked spring handle one member of which is secured to the frame, and disengageable operating devices connecting the other member of the spring handle with the said crankshaft and adapted to be used simultaneously with the crank by the other hand which grasps the said handle.

3. A driving mechanism, comprising a frame, a crankshaft journaled therein, two separate driving devices operatively connected with the said crankshaft and adapted to revolve it simultaneously, one of the said driving devices being operated by one hand, and the other driving device being operated by the other hand and provided with a handle which supports the frame and crankshaft, and being held in operative connection with the crankshaft by the pressure of the hand on the said handle.

In testimony whereof I have affixed my signature.

CHARLES C. SCHMAND.